(12) United States Patent
Jondeau et al.

(10) Patent No.: US 8,240,612 B2
(45) Date of Patent: Aug. 14, 2012

(54) DEVICE FOR CONTROLLING THE HEAT FLOWS IN A SPACECRAFT AND SPACECRAFT EQUIPPED WITH SUCH A DEVICE

(75) Inventors: Laurence Jondeau, Toulouse (FR); Christian Flemin, Dremil Lafage (FR); Fabrice Mena, Teulat (FR)

(73) Assignee: Astrium SAS, Paris (FR)

( * ) Notice: Subject to any disclaimer, the term of this patent is extended or adjusted under 35 U.S.C. 154(b) by 479 days.

(21) Appl. No.: 12/440,575

(22) PCT Filed: Sep. 11, 2007

(86) PCT No.: PCT/FR2007/051910
§ 371 (c)(1),
(2), (4) Date: Jun. 10, 2009

(87) PCT Pub. No.: WO2008/031985
PCT Pub. Date: Mar. 20, 2008

(65) Prior Publication Data
US 2010/0001141 A1 Jan. 7, 2010

(30) Foreign Application Priority Data
Sep. 15, 2006 (FR) .................................. 06 08119

(51) Int. Cl.
*B64G 1/52* (2006.01)
(52) U.S. Cl. ................... 244/171.8; 244/171.7
(58) Field of Classification Search ............... 244/171.8, 244/171.7, 117 A, 208
See application file for complete search history.

(56) References Cited

U.S. PATENT DOCUMENTS

| | | | | |
|---|---|---|---|---|
| 5,494,241 A * | 2/1996 | Poulain | .................. | 244/171.8 |
| 5,624,088 A * | 4/1997 | Fiore | .................... | 244/158.1 |
| 5,735,489 A * | 4/1998 | Drolen et al. | .......... | 244/171.8 |
| 5,794,890 A * | 8/1998 | Jones et al. | ............. | 244/171.8 |
| 5,806,800 A * | 9/1998 | Caplin | ................... | 244/171.8 |
| 5,806,803 A * | 9/1998 | Watts | .................... | 244/171.8 |
| 5,823,477 A * | 10/1998 | York | ..................... | 244/171.8 |
| 5,957,408 A * | 9/1999 | Hall et al. | .............. | 244/158.1 |
| 6,003,817 A * | 12/1999 | Basuthakur et al. | ..... | 244/164 |
| 6,073,887 A * | 6/2000 | Hosick | ................... | 244/171.8 |
| 6,073,888 A * | 6/2000 | Gelon et al. | ............ | 244/171.8 |
| 6,439,297 B1 * | 8/2002 | Dunbar et al. | .......... | 165/46 |
| 6,478,258 B1 * | 11/2002 | Yee | ........................ | 244/171.8 |
| 6,883,588 B1 * | 4/2005 | Low et al. | .............. | 165/41 |
| 7,143,813 B2 * | 12/2006 | Delgado et al. | ........ | 165/41 |

* cited by examiner

*Primary Examiner* — Christopher P Ellis
*Assistant Examiner* — Medhat Badawi
(74) *Attorney, Agent, or Firm* — Miller, Matthias & Hull LLP

(57) ABSTRACT

A device for controlling heat flow in a spacecraft which always has the same face facing towards the earth, a pair of mutually parallel opposed North and South faces perpendicular to the North-South axis of the earth and two pairs of mutually parallel opposed East/West and Earth/Anti-earth faces, heat-dissipating or -transmitting equipment being provided on the internal walls of the North and South faces, this device comprising a plurality of heat pipes connecting the North and South faces of said craft to another pair of opposed faces of said craft and forming a heat-pipe loop in thermal-conduction contact with one another.

15 Claims, 7 Drawing Sheets

DEVICE FOR CONTROLLING THE HEAT FLOWS IN A SPACECRAFT AND SPACECRAFT EQUIPPED WITH SUCH A DEVICE

CROSS-REFERENCE TO RELATED APPLICATIONS

This application is a U.S. national stage filing of International Patent Application No. PCT/FR2007/051910 filed on Sep. 11, 2007, which claims priority under the Paris Convention to French Patent Application No. 06 08119, filed on Sep. 15, 2006.

FIELD OF THE DISCLOSURE

The present invention relates to a device for controlling the heat flows in an orbiting spacecraft.

BACKGROUND OF THE DISCLOSURE

Due to its movement in orbit, the faces of a spacecraft or satellite are subject to variations in the flux of the sun's rays depending on their orientation and their distance from the sun. Thus, certain faces of the craft do not receive the same amount of thermal energy over a twenty-four hour period and over the seasons.

For example, in a known manner and as shown more specifically in FIG. 1, a spacecraft of the geostationary satellite type 1 comes in the form of a parallelepipedal housing 2 rotating in an orbit 3 around the Earth 4 and always has the same face turned towards the Earth, such face being called the Earth face 5A, the opposite and parallel face to the Earth face 5A being called the anti-Earth face 5B. The North face 6 and the South face 7 of the housing are both opposite each other, parallel to each other and perpendicular to the North-South axis of the Earth 4, whilst the East 8 and West 9 faces are another two opposite faces, parallel to each other and perpendicular to the direction of movement of the spacecraft 1. Because of the nature of the geostationary orbit, the North 6 and South 7 faces are relatively unexposed to the rays emitted by the sun 10 compared with the East 8 and West 9 faces, which are alternately exposed to such rays during an orbital revolution. Normally, the North 6 and South 7 faces are the faces to which solar panels 11 are attached and the East 8 and West 9 faces are the faces to which communications antennae are attached.

The temperature variations from one face to another and of a single face over time limit the heat dissipation capacity of these faces. Thus, a face exposed to the sun will not release heat or will release less heat compared to a face located in the shade or receiving few light rays.

As a result, in order to enable the control of the heat flows in a satellite, it is necessary to provide means allowing for the dissipation of the thermal energy received by one of the hot faces of the satellite.

To enable such control and dissipation of the thermal energy, radiating panels, capable of radiating the power dissipated into space whilst minimizing the solar fluxes absorbed when these panels are exposed to the sun, are provided on faces of the satellite.

In a known manner, the North and South faces are used for heat dissipation due to the fact that they receive a small quantity of solar flux that is relatively constant over time.

As a result, it is standard practice to place on these North and South faces of the satellite heat-dissipating units known as "hot sources" such as a travelling-wave tube or OMUX (output multiplexer), which must also be thermally controlled by dissipation of their thermal energy by means of these radiators or radiating panels, when they are operational.

In order to allow for greater heat dissipation, the radiating surface would have to be increased. However, the surfaces that can be used for thermal radiation are limited by the volume available in the space launcher and the components already provided for on the surface of the satellite, such as the antennae.

Thus, because the thermal power available is limited, one of the main challenges for telecommunications satellite manufacturers is obtaining the best compromise between the power dissipated, the radiating surfaces and the mass of the satellite.

In order to increase the quantity of heat that can be dissipated, it is standard practice to provide within the satellite means of transferring heat from a hot face to a colder face that can dissipate more heat.

Thus, in order to enable the dissipation of heat from one face of the satellite to another, document U.S. Pat. No. 5,806,803 presents a system of heat pipes linking one face of a satellite to another opposite parallel face of the satellite by passing through an internal transverse panel. However, this system is relatively complex to implement and has constraints with regard to internal space occupied.

According to the same principle, that is the direct connection of two parallel opposite faces of a satellite to each other by means of a system of heat pipes, document US 2002/0139512 presents a system of heat pipes transversely linking the East face to the West face of the satellite in such a way as to share the thermal load between these two faces.

According to document U.S. Pat. No. 6,073,888, a heat flow control system is incorporated by placing radiators on the North, South, East and West faces and connecting them to a thermal load or dissipating units by means of Variable Conductance Heat Pipes (VCHP) or Diode Heat Pipes (DHP). However, this system is also complex to implement and poses incorporation constraints in terms of mass and volume, which represent a major restriction on its use.

Document U.S. Pat. No. 6,073,887 discloses a heat flow control system based on heat pipes in which a coolant circulates, that link certain faces of the satellite to each other and allow for the East and West faces to be used as radiating faces on which heat-emitting electronic equipment can be placed, in addition to the North and South faces on which such equipment is already installed. The production of a heat pipe loop connecting the East, West, Earth and anti-Earth faces is thus envisaged, in such a way as to control the thermal power on all of the faces.

This document does not however envisage enabling greater heat dissipation from the North and South faces, but conversely increasing the heat dissipation from the East and West faces by forming a heat pipe loop passing through the East, West, Earth and anti-Earth faces.

Document EP 1 468 911 presents a heat flow control system enabling the dissipation of these flows by means of the North, South, East and West faces based on a rack holding the equipment and heat transfer means to transfer the heat released by the heat-emitting electronic equipment to the North, South, East and West radiating panels, the heat transfer means being made up of at least one capillary pumped diphasic fluid loop.

However, according to this prior art it is necessary to add a structure, namely a rack, to hold the heat flow control system, which leads to constraints in terms of space occupied.

According to document U.S. Pat. No. 6,073,888, and more specifically the embodiment illustrated in FIG. 7 of that document, the production of a device for controlling the heat flows in a spacecraft that always has the same face turned towards the Earth is known, using a set of heat pipes placed either on the North face or on the South face, to which a thermal load is attached, and which is curved and extends over the East and West faces of the spacecraft. However, such a heat flow control device is not autonomous and cannot operate continuously over time. Indeed, it is necessary to provide thermal switches to enable the satisfactory operation of this device, which makes it difficult to implement and costly.

The production of a device for controlling the heat flows in a spacecraft is also known from document GB 2 270 666, using heat pipes linking the Earth face of the craft to the South and North faces, which results in the formation of a set of heat pipes linking three faces of the craft. However, this embodiment similarly does not allow for the production of a heat flow control device that is autonomous and can operate in all seasons.

It would therefore be particularly beneficial to produce a heat flow control system allowing for the dissipation of the heat emitted by electronic equipment placed on the North and South faces that does not require the addition of a transverse panel or a component arranged transversely between two opposite faces of the satellite.

It would therefore be particularly beneficial to produce a device for the thermal control of the power dissipated by the North and South faces of a geostationary satellite allowing for an increase in the number of pieces of heat-emitting electronic equipment on these faces whilst not generating constraints in terms of weight and space occupied.

SUMMARY OF THE DISCLOSURE

It would also be beneficial to produce an autonomous heat flow control device that could operate in all seasons and in a completely passive manner, that is, without requiring any intervention or modification of its operating mode over time or depending on its position on its orbit.

Thus, one of the objects of the present invention is to provide a system for controlling the heat flows in a spacecraft allowing for the improvement of the capacity to dissipate the heat flows emitted by the North and South faces whilst operating in an autonomous, continuous and passive manner.

Another object of the present invention is to produce a compact heat flow control system with a mass that meets launcher criteria.

To this end, the present invention relates to a device for controlling the heat flows in a spacecraft that always has the same face turned towards the Earth, a pair of opposite, parallel North and South faces perpendicular to the North-South axis of the Earth and two pairs of opposite, parallel faces, East/West and Earth/anti-Earth, heat-dissipating or -transmitting equipment being provided on the internal walls of the North and South faces, characterized in that it comprises a plurality of heat pipes linking the North and South faces of said craft to another pair of opposite faces of said craft and forming a loop of heat pipes in thermal conduction contact with each other. In this way, it is possible to enable greater dissipation of the heat emitted by the North and South faces, as the heat emitted is transferred to two other faces of the spacecraft, these faces being alternately illuminated by the solar fluxes, and there is therefore always one face substantially in the shade that can dissipate the heat flows more easily.

In order to allow for the formation of a loop of heat pipes in contact with each other on four separate faces of the spacecraft, the device according to the invention comprises at least one pair of connecting heat pipes with first and second branches, the first branch of one of the connecting heat pipes of said pair of connecting heat pipes being attached, in thermal conduction contact, to a radiating panel on the North face, and the first branch of the second of the connecting heat pipes of said pair of connecting heat pipes being attached, in thermal conduction contact, to a radiating panel on the South face.

According to a first embodiment of the heat pipe loop, said first branch of said connecting heat pipe is attached to at least part of an extension of the radiating panel either on the North face or on the South face, overhanging said other pair of opposite faces.

According to a second embodiment of the heat pipe loop, said first branch of said connecting heat pipe is attached to the internal wall of said radiating panel either on the North face or on the South face, in the internal volume defined by the faces of said spacecraft.

In such a way as to enable the dissipation of heat from the faces of said pair of opposite faces, said second branch of said connecting heat pipe is attached to the external wall of one of the faces belonging to said other pair of opposite faces.

In order to increase the dissipating surface of the faces of said pair of opposite faces, a radiating panel is attached to said second branches of said pair of connecting heat pipes.

Advantageously, said first and second branches of said connecting heat pipe are the same length.

Alternatively, in order to allow for the formation of a loop of heat pipes in thermal conduction contact with each other, said second branch of said connecting heat pipe of said pair of connecting heat pipes is attached in thermal conduction contact to another second branch of another connecting heat pipe of said pair of connecting heat pipes, which is itself attached to the external wall of one of the faces belonging to said other pair of opposite faces.

Advantageously, said second branch of said connecting heat pipe is longer than said first branch of said connecting heat pipe.

According to a specific embodiment, and in order to increase the radiating surface of the faces of the pair of opposite faces, a plate, preferably aluminium, is attached to the second branches of said connecting heat pipes on the same face belonging to said other pair of opposite faces that are in thermal conduction contact with a second branch of another connecting heat pipe.

According to an alternative specific embodiment, and in order to increase the radiating surface of the faces of the pair of opposite faces, said second branch of said connecting heat pipe, which is attached to the second branch of another connecting heat pipe, comprises a pair of fins tangential to a tubular component in which a coolant circulates, one of the fins having a larger transverse dimension than the other fin.

Advantageously, at least one radiating panel with a honeycomb structure is provided on the North and South faces, on or in which networks of heat pipes are attached.

According to a specific embodiment of a radiating panel, the honeycomb structure comprises a first network of heat pipes housed in cells of said honeycomb and a second network of heat pipes placed externally on a surface of said honeycomb and perpendicular to the heat pipes in the first network.

According to an alternative specific embodiment of a radiating panel, the honeycomb structure comprises a first network of heat pipes housed in cells of said honeycomb and a second network of heat pipes passing through said cells perpendicularly to the heat pipes in the first network.

The present invention also relates to a spacecraft equipped with a heat flow control device with characteristics as described above.

BRIEF DESCRIPTION OF THE DRAWINGS

The present invention will now be described using examples for illustration only that in no way limit the scope of the present invention and are based on the attached drawings in which.

DETAILED DESCRIPTION OF THE DISCLOSURE

In the description below, the terms "heat-dissipating unit" or "heat-transmitting unit" must respectively be understood as being any component of the spacecraft 1 capable of dissipating heat or capable of transmitting heat, it being understood that the term "hot source" is equivalent to these two terms. Furthermore, the terms "spacecraft" and "satellite" must be seen as equivalent.

In addition, the concepts of "verticality" and "horizontality", which are used in the description, are defined solely in relation to the representation of the satellite in the figures and must not under any circumstances be understood to be limitative concepts. Consequently, a horizontal component is a component substantially parallel with or on the East-West axis, whilst a vertical component is a component substantially parallel with or on the North-South axis.

Figure 17:
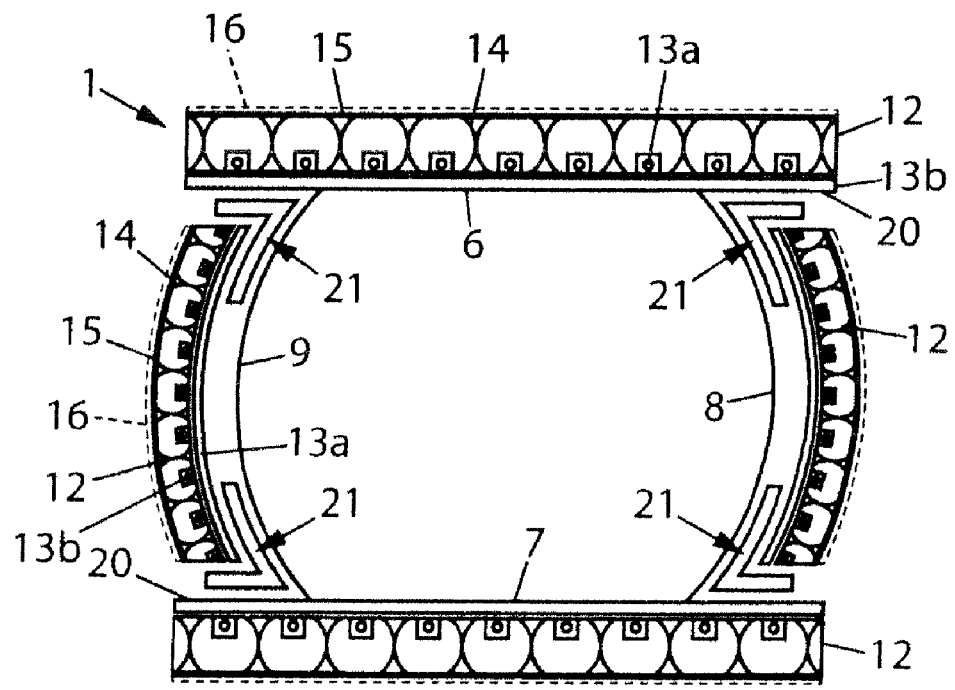
FIG. 17 is a diagrammatic cross-sectional view of another satellite comprising the device according to the first embodiment of the invention.
Figure 18:
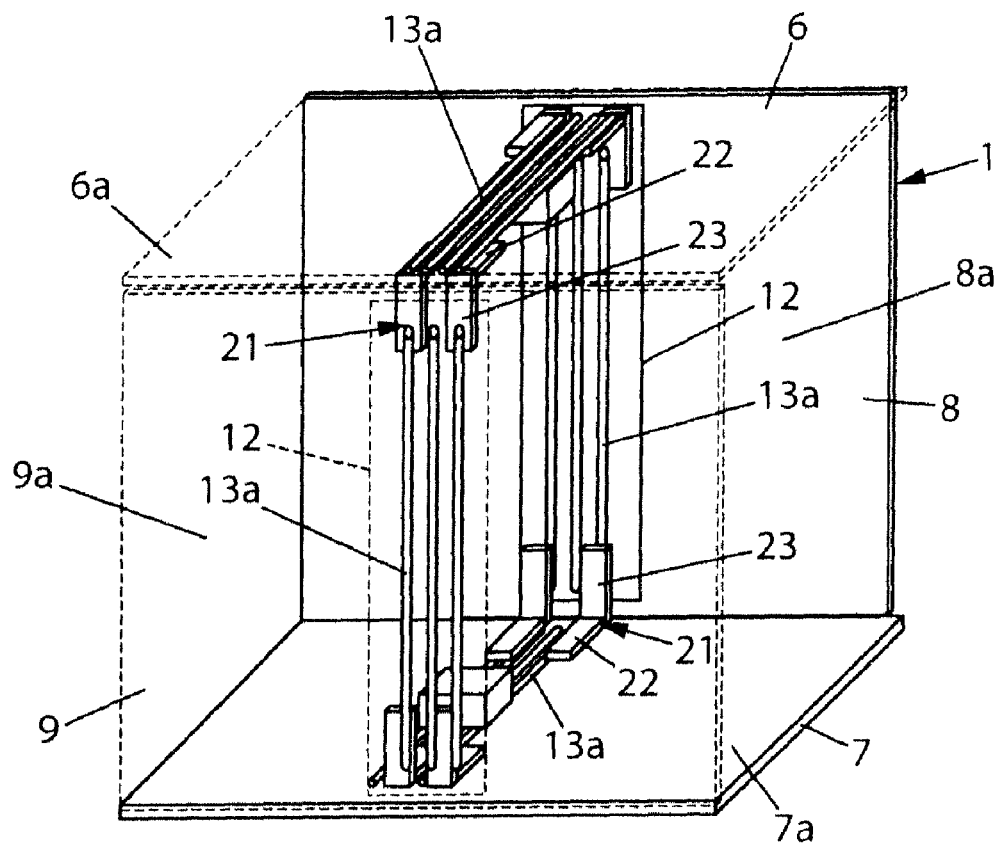
FIG. 18 is a perspective view of a third embodiment of the device according to the invention.

Thus, in a scenario in which the satellite 1 has a generally parallelepipedal shape, the North face 6 and the South face 7 of the satellite are deemed to be horizontal surfaces and the East face 8, the West face 9, the Earth face 5A and the anti-Earth face 5B (face opposite and parallel to the Earth face 5) are deemed to be vertical surfaces, it being understood that, according to the preferred embodiment of a satellite, all of these faces form a parallelepipedal whole, but satellites can also be envisaged, as shown in FIGS. 17 and 18, with certain faces inclined relative to others.

Figure 1:
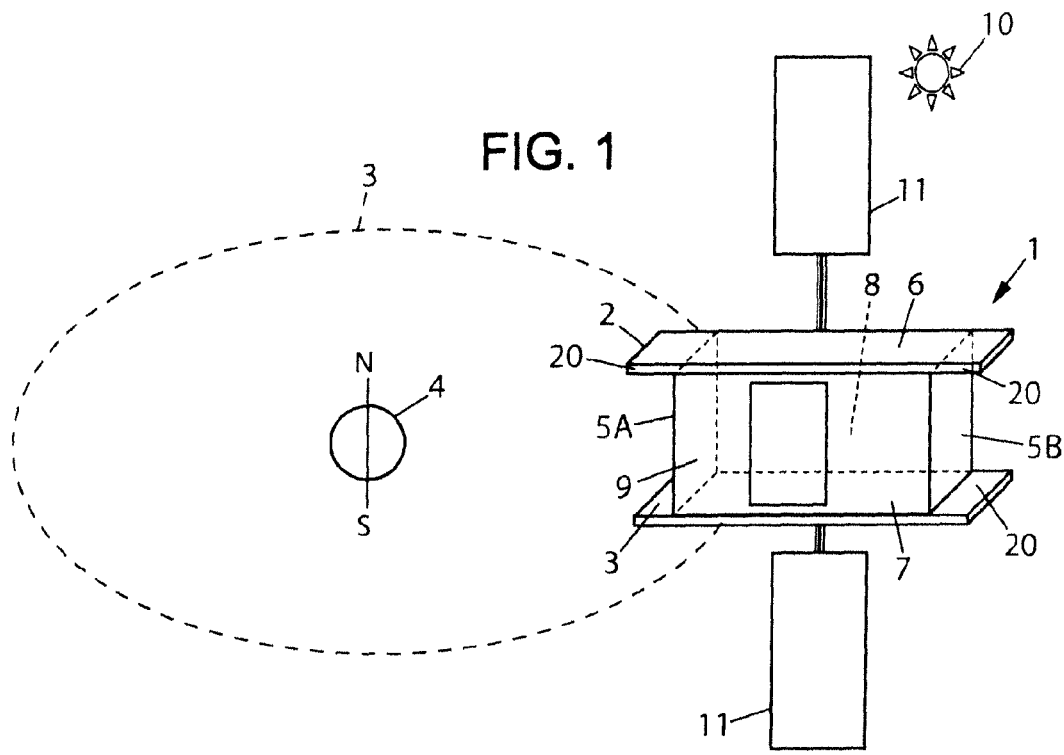
FIG. 1 is a diagrammatic representation of a spacecraft or geostationary satellite in its orbit.
Figure 2:
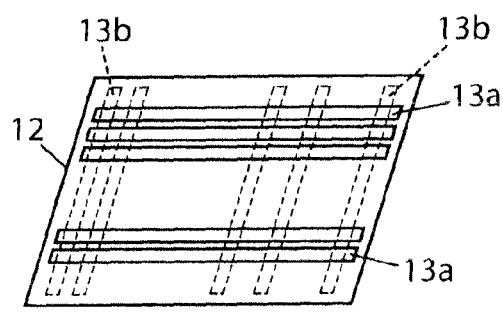
FIG. 2 is a diagrammatic top view of the networks of heat pipes present in a honeycomb structure radiating panel.

FIG. 2 is a diagrammatic top view of a radiating panel with a honeycomb supporting structure 12 capable of being incorporated at least partly into one of the faces 5-9 of the satellite 1.

Two networks of heat pipes 13a, 13b perpendicular to each other are associated with this honeycomb radiating panel 12, each heat pipe 13a, 13b taking the form of a substantially longitudinal tubular component the internal orifice of which is filled with a coolant, preferably ammonia.

According to a first embodiment of a honeycomb radiating panel 12, a first network 13a of heat pipes incorporated into the cells 14 of the honeycomb 12 and a second network 13b of heat pipes in contact perpendicularly with the heat pipes in the first network 13a are provided, the heat pipes in the second network 13b being placed externally on a surface of the honeycomb 12, advantageously on the surface of the honeycomb 12 intended to face the inside of the spacecraft 1.

In order to enable the reflection of the luminous fluxes received by the faces 5-9 of the satellite 1 on which the honeycomb radiating panels 12 are installed, provision is made for the external surface of the honeycomb 12, that is, the surface of the honeycomb 12 intended to face space, to be covered with an aluminium plate 15 coated with a reflective coating 16, preferably of an OSR (Optical Solar Reflector) type or, alternatively, a coat of white paint.

Figure 4:
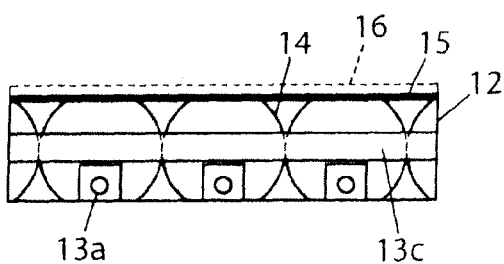
FIG. 4 is a diagrammatic cross-sectional view of a second embodiment of a honeycomb radiating panel.

According to a second embodiment of a honeycomb radiating panel 12 shown in diagrammatic cross-section in FIG. 4, the second network of heat pipes 13c is provided directly incorporated into the honeycomb structure 12 with the heat pipes 13c of this second network in contact perpendicularly with the heat pipes in the first network 13a.

Provision can thus be made for the heat pipes 13c in this embodiment of the second network to pass through the cells 14 in which the heat pipes 13a in the first network are housed.

Figure 5A:
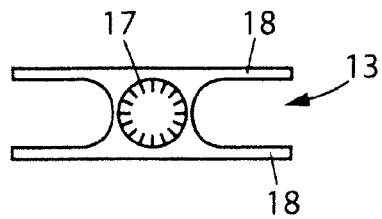
FIG. 5A is a diagrammatic cross-sectional view of a first embodiment of a heat pipe.
Figure 5B:
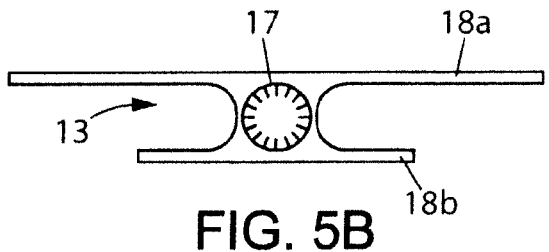
FIG. 5B is a diagrammatic cross-sectional view of a second embodiment of a heat pipe.

FIGS. 5A and 5B respectively show two diagrammatic cross-sectional views of a possible embodiment of a heat pipe 13.

According to the first embodiment shown in FIG. 5A, the heat pipe 13, of a type known per se, is made up of a hollow tubular component 17 filled with a coolant, advantageously ammonia, and has a pair of parallel tangential fins 18 of substantially the same length.

According to the second embodiment shown in FIG. 5B, one fin 18a is longer than the other fin 18b.

The fins 18 advantageously allow for the dissipation of the heat stored by the coolant contained in the heat pipe 13. Thus, the longer the fins 18, the greater the quantity of heat capable of being dissipated by the heat pipe 13.

Figure 6:
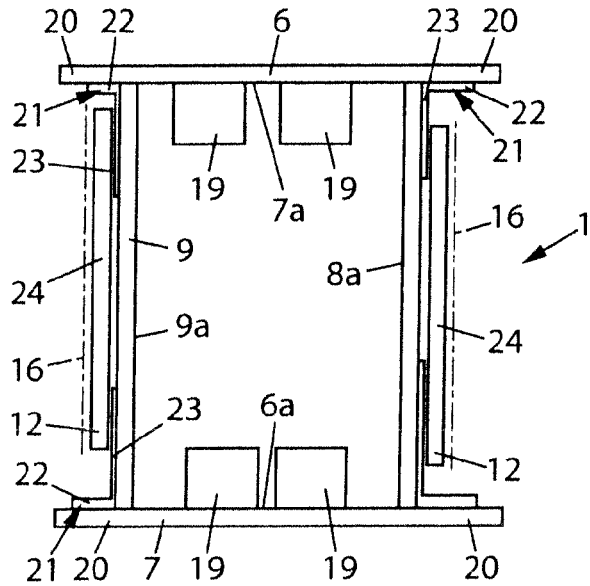
FIG. 6 is a diagrammatic cross-sectional view of a first embodiment according to the invention of the device for controlling the heat flows between the North and South faces of a geostationary satellite.

FIG. 6 is a diagrammatic cross-sectional view of a first embodiment of the device according to the invention for controlling the heat flows between the North 6 and South 7 faces of a geostationary satellite 1.

At least one hot source 19 is provided on the internal wall 6a of the North face 6 and on the internal wall 7a of the South face 7, such as a travelling-wave tube or OMUX (output multiplexer), placed and attached in thermal conduction contact on a honeycomb radiating panel 12 and more specifically on the heat pipes 13a, 13b, 13c linked to this radiating panel.

The hot source 19 is either a piece of heat-dissipating equipment or a heat-transmitting component.

The North 6 and South 7 faces of the spacecraft 1 are provided with extensions or ledges 20, preferably in the form of rectangular plates, overhanging the East and West 8, 9 pair of opposite vertical faces or the Earth 5A and anti-Earth 5B pair of opposite vertical faces.

Thus, when the North face 6 (respectively South 7) is provided with two extensions 20 overhanging the East 8 and West 9 faces, the satellite 1 has a first extension 20 of the North face 6 (respectively South 7) overhanging the East face 8 and a second extension 20 of the North face 6 (respectively South 7) overhanging the West face 9, the first and second extensions 20 both being the same size and length.

Similarly, when the North face 6 (respectively South 7) is provided with two extensions 20 on the Earth 5A and anti-Earth 5B faces, the satellite 1 has a first extension 20 of the North face 6 (respectively South 7) overhanging the Earth face 5A and a second extension 20 of the North face 6 (respectively South 7) overhanging the anti-Earth face 5B, the first and second extensions 20 both being the same size and length.

In order to form a heat pipe loop linking the North 6 and South 7 pair of faces to the East 8 and West 9 (respectively Earth 5A and anti-Earth 5B) pair of opposite vertical faces alternately lit by the sun, at least one pair of connecting heat pipes 21 is provided on each of the East 8 and West 9 faces (respectively Earth 5A and anti-Earth 5B), in an L shape, with a horizontal branch 22 attached to the internal wall of the North face 6 or South face 7 and a vertical branch 23 attached to the external wall of the East face 8 or West face 9 (respectively of the Earth face 5A or the anti-Earth face 5B).

A closed heat pipe loop is thus formed, in thermal conduction contact on four faces of the satellite 1, that is, linking either the North 6, South 7, East 8 and West 9 faces, or the North 6, South 7, Earth 5A and anti-Earth 5B faces. This closed loop operates continuously in all seasons, whatever the position on the orbit, with the heat exchanges being controlled autonomously, the face of the satellite 1 that receives the most heat flow transmitting thermal energy either to the coldest face of the satellite 1 that receives the least heat flow or directly into space via the East or West faces, depending on the position on the orbit.

According to the first embodiment of the invention, the horizontal branch 22 attached to the internal wall of the North 6 or South 7 face is more specifically attached to the internal wall of the extension 20 of the North 6 or South 7 face, opposite the internal wall of the other extension 20 of the North 6 or South 7 face.

A honeycomb 12 plate 24 forming a radiating panel is advantageously attached to the vertical branches 23 of a pair of connecting heat pipes 21 placed on a same vertical face of the spacecraft 1.

Figure 3:
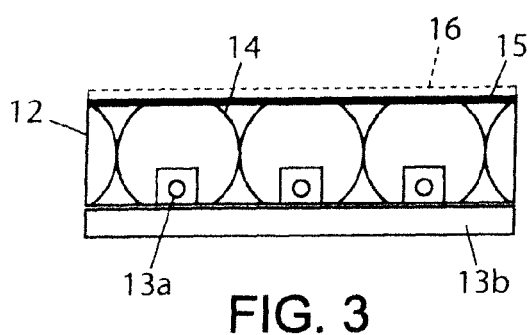
FIG. 3 is a diagrammatic cross-sectional view of a first embodiment of a honeycomb radiating panel.
Figure 7:
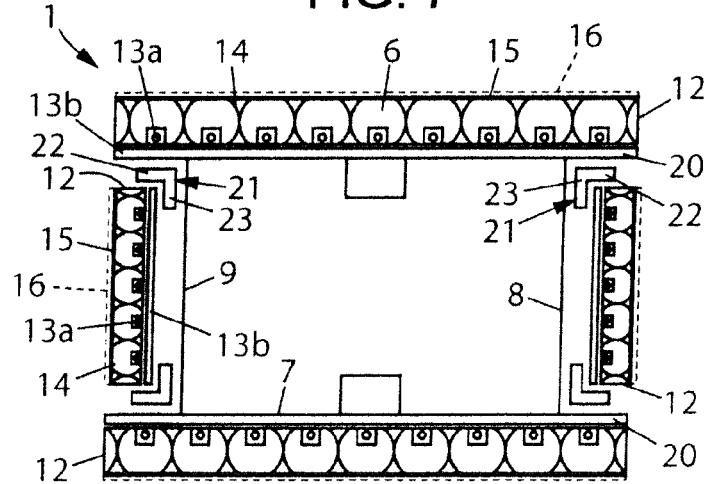
FIG. 7 is a detailed diagrammatic cross-sectional view of the device in FIG. 6 in which the networks of heat pipes are linked to the honeycomb radiating panel shown in FIG. 3.

FIG. 7 is a detailed diagrammatic cross-sectional view of the device in FIG. 6 in which the various radiating panels are as shown in FIG. 3.

In order to allow for the dissipation of the heat emitted by the hot sources 19 placed on the internal wall of the North and South faces 6, 7, the hot sources are attached to the second network 13b of heat pipes placed on the outside of the honeycomb supporting structure 12.

The honeycomb 12 plate 24 attached to the at least one pair of L-shaped connecting heat pipes 21 has a structure as described in FIG. 3. In this case, the vertical branches 23 of the connecting heat pipes 21 are in direct contact with the heat pipes 13b in the second network outside the honeycomb structure 12.

Figure 8:
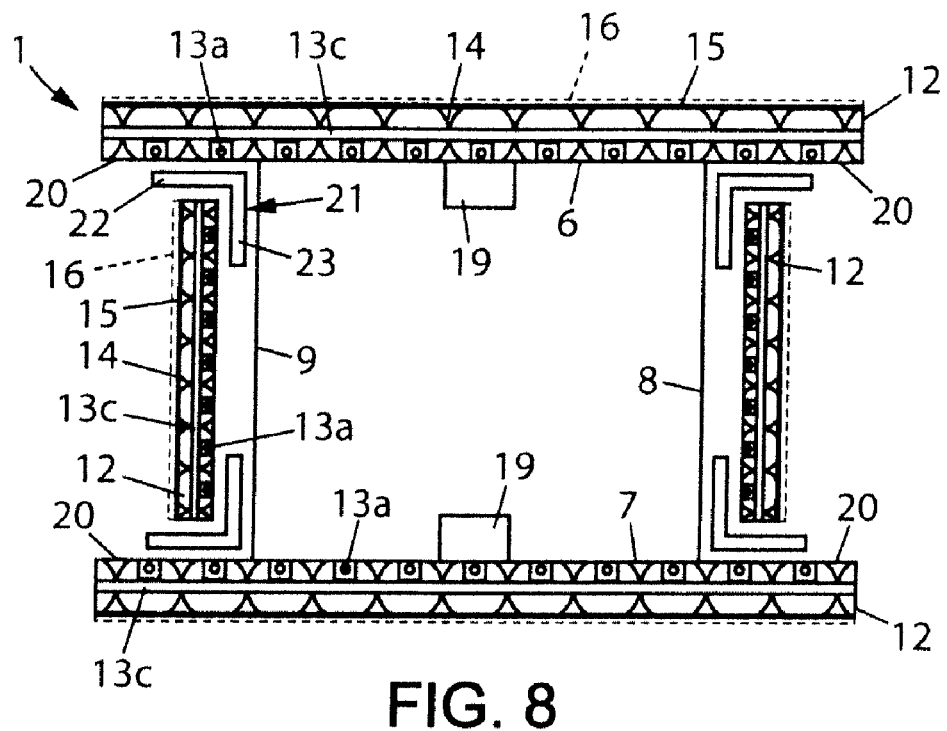
FIG. 8 is a diagrammatic cross-sectional view of the device in FIG. 6 in which the networks of heat pipes are linked to the honeycomb radiating panel shown in FIG. 4.

According to a second embodiment and as shown in FIG. 8, the honeycomb structures 12 installed on the spacecraft 1 are of the type described in FIG. 4. Thus, the honeycomb 12 plates 24 placed on the at least one pair of connecting heat pipes 21, as well as the honeycomb radiating structures 12 provided at least partly on the North 6 and South 7 faces, are of the type described in FIG. 4.

The hot sources 19 are then placed directly on the heat pipes in the first network 13a of heat pipes, in which the heat pipes are incorporated into the cells 14, and the horizontal branches 22 of the connecting heat pipes 21 are also directly in contact with the heat pipes 13a in this first network.

Alternatively, it is also possible to provide a combination of the embodiments described in FIGS. 7 and 8, that is, to use the honeycomb radiating panels 12 described in FIG. 3 for the North 6 and South 7 faces and the honeycomb radiating panels 12 described in FIG. 4 as a linking plate 24 between a pair of connecting heat pipes 21 provided on the East 8, West 9, Earth 5A or anti-Earth 5B vertical face.

It is also possible to use the honeycomb radiating panels 12 described in FIG. 4 for the North 6 and South 7 faces and the honeycomb radiating panels 12 described in FIG. 3 as a linking plate 24 between a pair of connecting heat pipes 21 provided on the East 8, West 9, Earth 5A or anti-Earth 5B face.

Figure 9:
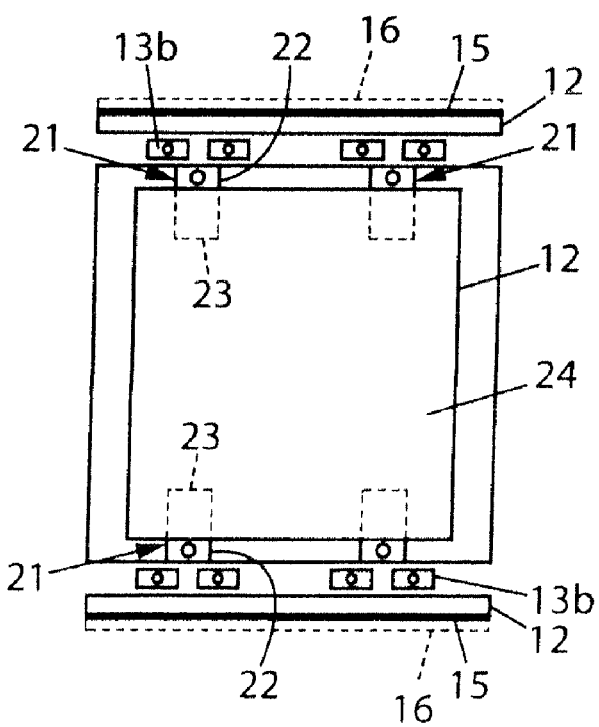
FIG. 9 is a front view of a vertical face of the satellite comprising the first embodiment of the device according to the invention shown in FIG. 6.

FIG. 9 shows a front perspective diagrammatic view of a spacecraft with, on one vertical face, a honeycomb radiating plate 24 placed on at least one pair of L-shaped connecting heat pipes 21.

The number of L-shaped connecting heat pipes 21 present on each extension 20 of the North 6 and South 7 faces depends on the dimensions of the honeycomb 12 radiating plate 24 and on the number and distribution of the heat pipes 13a, 13b present in the honeycomb structure 12 on the North 6 and South 7 faces.

Figure 10:
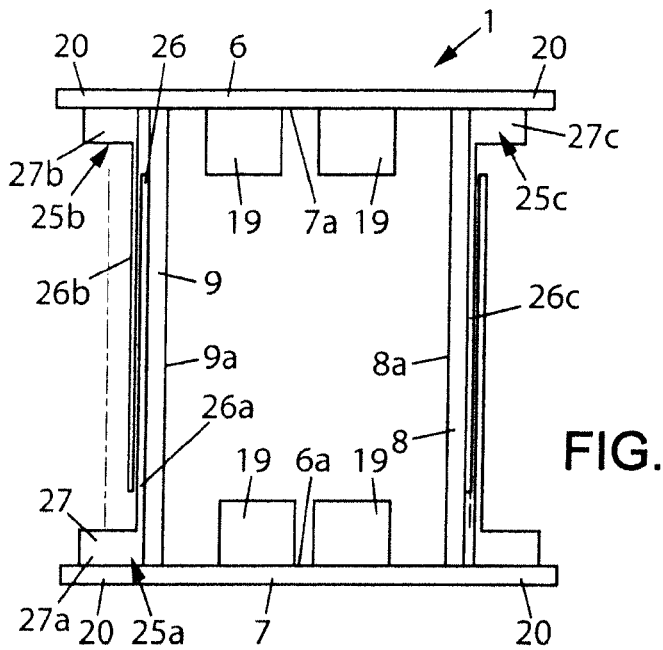
FIG. 10 is a diagrammatic cross-sectional view of a second embodiment of a heat flow control device according to the invention.

FIG. 10 is a diagrammatic cross-sectional view of a second embodiment of the device according to the invention for controlling the heat flows emitted by hot sources 19 placed in contact with radiating panels on the North 6 and South 7 faces of a geostationary satellite 1 with at least one pair of connecting heat pipes 25 between the North face 6 and the South face 7 of the satellite 1, placed on the same vertical face, in the form of L-shaped heat pipes with a main vertical branch 26 and a secondary horizontal branch 27, the main vertical branch 26 being longer than the secondary vertical branch 27.

The secondary horizontal branch 27 of the connecting heat pipe 25 is intended to be placed in contact with the internal surface of the extension 20 of the North 6 and South 7 faces, whilst the main vertical branch 26 is intended to be placed either in contact with the vertical East, West, Earth or anti-Earth face of the satellite 1, or on a main vertical branch 26 of another connecting heat pipe 25.

Figure 11:
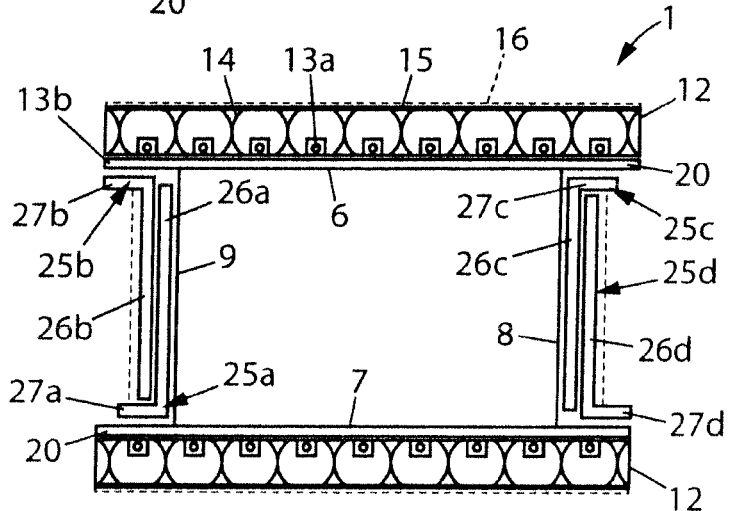
FIG. 11 is a detailed diagrammatic cross-sectional view of an embodiment of the second embodiment of the device in FIG. 10 in which the networks of heat pipes are linked to the honeycomb radiating panel shown in FIG. 3.

According to the specific embodiment shown in FIG. 11, a radiating panel in the form of a honeycomb 12 of the type described in FIG. 3 is provided on the North face 6 and the South face 7. Nonetheless, it is also possible to provide a radiating panel in the form of a honeycomb 12 of the type described in FIG. 4.

More specifically, at least one pair of connecting heat pipes 25a, 25b is provided on the West face 9, and made up of:

- a first connecting heat pipe known as the "lower heat pipe" 25a with a horizontal secondary branch 27a placed on the internal face of the extension 20 of the South face 7 overhanging the West face 9 and a main vertical branch 26a placed in direct contact on the West face 9;
- a second connecting heat pipe known as the "upper heat pipe" 25b with a horizontal secondary branch 27b placed on the internal face of the extension 20 of the North face 6 overhanging the West face 9 and a main vertical branch 26b arranged on the main vertical branch 26a of the lower connecting heat pipe 25a.

Symmetrically, at least one pair of connecting heat pipes 25c, 25d is provided on the East face 8, and made up of:

- a first connecting heat pipe known as the "lower heat pipe" 25c with a horizontal secondary branch 27c placed on the internal face of the extension 20 of the North face 6 overhanging the East face 8 and a main vertical branch 26c in direct contact with the East face 8;
- a second connecting heat pipe known as the "upper heat pipe" 25d with a horizontal secondary branch 27d in contact on the internal face of the extension 20 of the South face 7 overhanging the East face 8 and a main vertical branch 26d arranged on the main vertical branch 26c of the lower connecting heat pipe 25c.

Alternatively, it is also possible to provide that the extensions 20 shown overhanging the East 8 and West 9 faces overhang the Earth 5A and anti-Earth 5B faces and that, consequently, the connecting heat pipes 25 are then positioned in relation to these Earth 5A and anti-Earth 5B faces, with the main vertical branch 26a, 26c of the lower connecting heat pipe 25a, 25c then being attached to either the Earth face 5A or the anti-Earth face 5B.

The number and distribution of the connecting heat pipes 25 differs depending on the number and distribution of the heat pipes 13a, 13b, 13c associated with the honeycomb radiating panel 12 provided in the North 6 or South 7 face.

Figure 12:
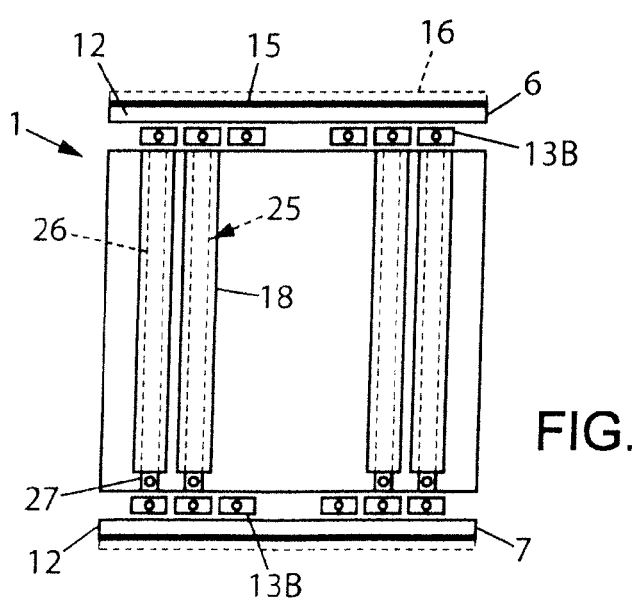
FIG. 12 is a front view of a vertical face of the satellite according to the second embodiment of the device according to the invention shown in FIG. 11.

For illustrative purposes only, FIG. 12 shows an application of the positioning and distribution of the connecting heat pipes 25 on a vertical face, that is, either the East 8, West 9, Earth 5A or anti-Earth 5B face.

According to this specific embodiment, the North 6 and South 7 faces each have a honeycomb structure 12 with an external network of heat pipes 13b in the form of two groups of three heat pipes 13b. Two lower connecting heat pipes 25a, 25c are then associated with each of these groups, and two upper connecting heat pipes 25b, 25d are placed on them, thus forming two pairs of connecting heat pipes.

It must be understood that the purpose of the lower and upper connecting heat pipes 25a-25d is to capture the heat stored by the horizontal heat pipes incorporated into the honeycomb radiating panels 12 on the North 6 and South 7 faces and transfer it to the other faces of the spacecraft 1 to which they are attached, thus allowing for better distribution of the heat emitted by the North 6 and South 7 faces to the other vertical faces of the satellite 1.

It is not therefore strictly necessary, for reasons of weight and volume, to provide a respective pair of connecting heat pipes 25 made up of a lower vertical connecting heat pipe 25a, 25c and an upper vertical connecting heat pipe 25b, 25d for each external horizontal heat pipe 13b on the North 6 and South 7 faces.

According to the embodiment shown in FIG. 12, a pair of connecting heat pipes 25 made up of a lower vertical connecting heat pipe 25a, 25c and an upper vertical connecting heat pipe 25b, 25d is thus provided for two external horizontal heat pipes 13b linked to the radiating panel on the North face 6 and two external horizontal heat pipes 13b linked to the radiating panel on the South face.

Figure 13:
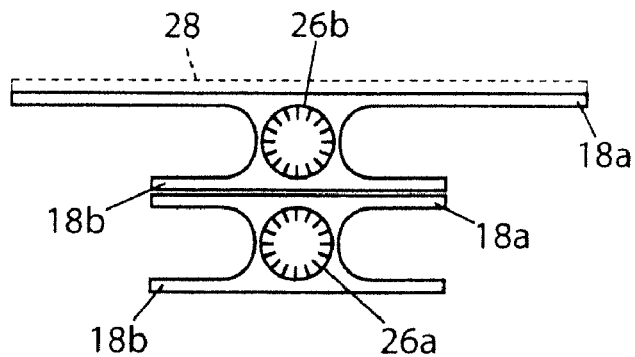
FIG. 13 is a diagrammatic cross-sectional view of a pair of heat pipes placed on a vertical face of the satellite according to the embodiment of the invention shown in FIG. 11.

FIG. 13 shows a diagrammatic cross-sectional view of a vertical branch 26a of the lower connecting heat pipe 25a on which a vertical branch 26b of the upper connecting heat pipe 25b is placed.

It will also be noted that, to allow for the dissipation of a greater quantity of heat flow into space, the upper fin 18a on the vertical branch 26b of the upper connecting heat pipe 25b is larger than the lower fin 18b on the same vertical branch 26b, which is in contact with the upper fin 18a of the vertical branch 26a of the lower connecting heat pipe 25a. The vertical branch 26b of the upper connecting heat pipe 25b is therefore of the type described in FIG. 5B, whilst the vertical branch 26a of the lower connecting heat pipe 25a is of the type described in FIG. 5A.

In order to increase the reflection effect of the solar fluxes received by the upper fin 18a of the vertical branch 26b of the upper connecting heat pipe 25b, provision is made for this upper fin 18a to be covered with a reflective coating layer 28, preferably OSRs.

Alternatively, it is possible to provide that the vertical branch 26b of the upper connecting heat pipe 25b and the vertical branch 26a of the lower connecting heat pipe 25a have fins 18 of the same size.

Figure 14:
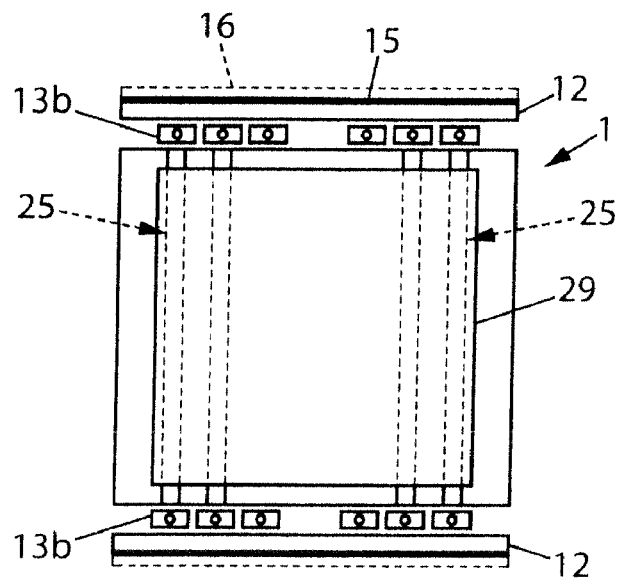
FIG. 14 is a front view of an alternative embodiment of the second embodiment of the device according to the invention shown in FIG. 10.
Figure 15:
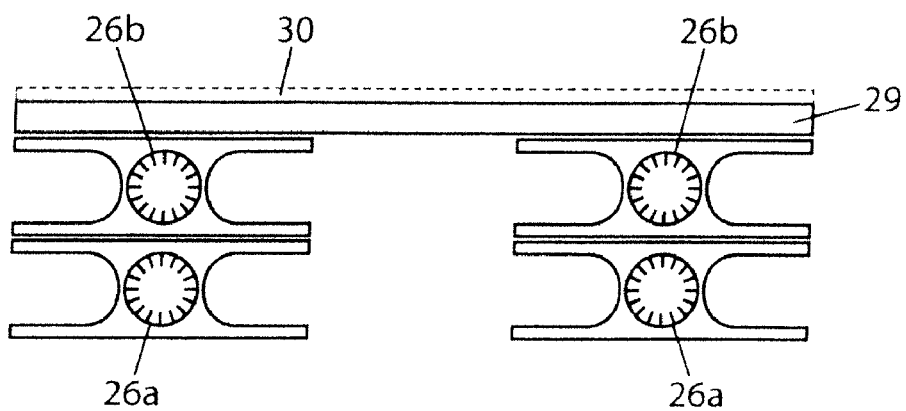
FIG. 15 is a diagrammatic cross-sectional view of a pair of heat pipes placed on a vertical face of the satellite according to the alternative embodiment of the second embodiment shown in FIG. 14.

In this case, as shown in FIGS. 14 and 15, and in order to increase the dissipation into space of the heat stored in the connecting heat pipes 25, provision is made for attaching, on the plurality of upper fins 18b of the vertical branches 26b, 26d of the upper connecting heat pipes 25b, 25d provided on the same vertical face, a plate 29, preferably aluminium, covered with a reflective coating 30, such as an OSR.

Figure 16:
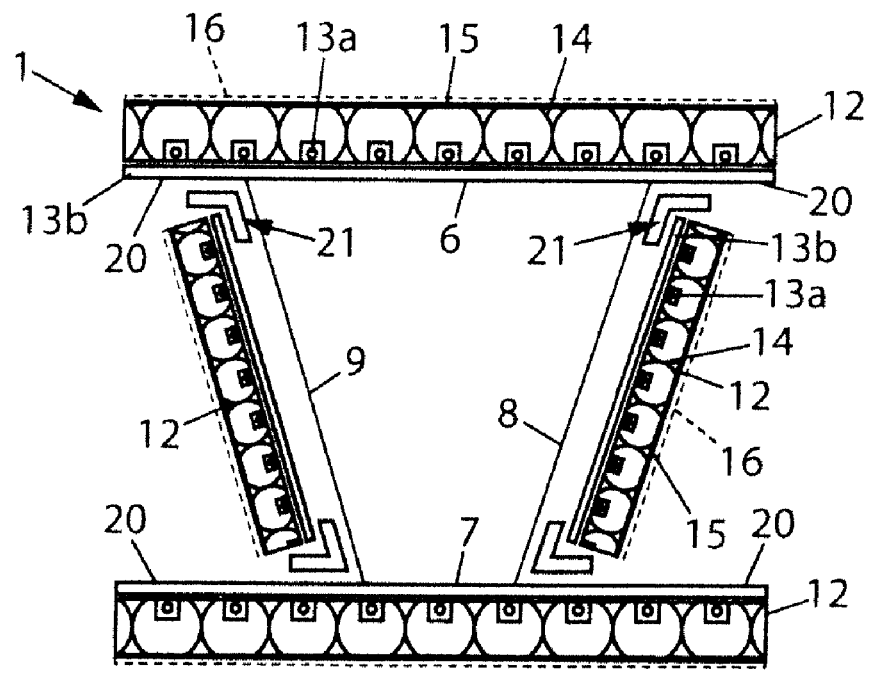
FIG. 16 is a diagrammatic cross-sectional view of a satellite comprising the device according to the first embodiment of the invention.

FIGS. 16 and 17 show diagrammatic cross-sectional views of the heat flow control device according to the first embodiment of the invention, installed on two geostationary satellites that do not have a generally parallelepipedal shape.

Thus, in the spacecraft shown in FIG. 16, the vertical faces, for example East 8 and West 9, are inclined relative to the vertical and symmetrically relative to the central North-South axis.

In this case, the connecting heat pipes 21 are not made up of two branches perpendicular to each other but of two non-perpendicular branches.

The same applies to the spacecraft shown in FIG. 17, which has curved vertical faces.

It will be clearly understood that the principle of the invention applies to any shape of spacecraft.

Figure 19:
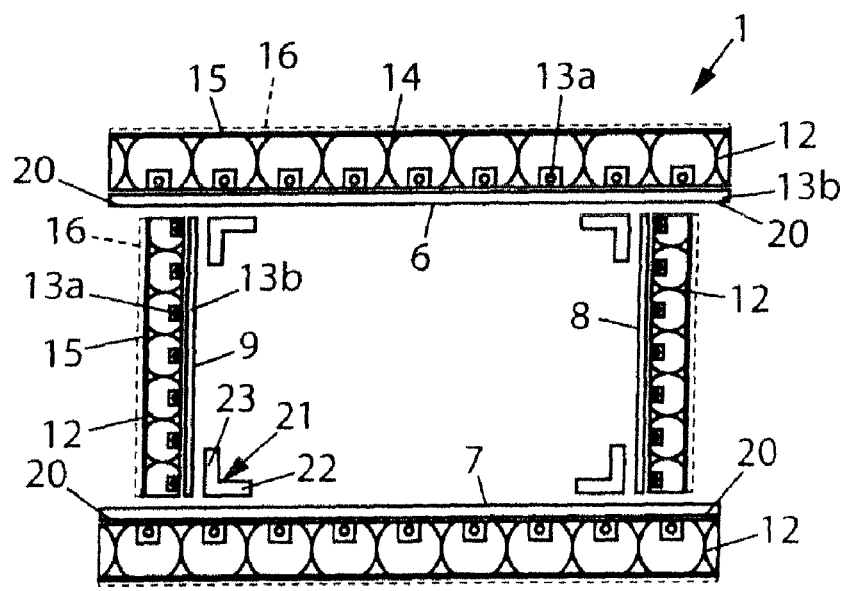
FIG. 19 is a diagrammatic cross-sectional view of the third embodiment of the device according to the invention.

FIG. 18 is a perspective view of a third embodiment of the device according to the invention, and FIG. 19 is a diagrammatic cross-sectional view of the third embodiment of the device according to the invention.

According to this third embodiment, provision is made for the L-shaped connecting heat pipes 21 to be placed and attached internally on the internal walls of the faces of the satellite 1.

Otherwise, the device according to the invention remains identical to the devices described above, except that the horizontal branch 22 of the connecting heat pipes 21 is not placed on the extensions 20 of the North 6 and South 7 faces, but on the internal wall of the North 6 and South 7 faces, in the internal space of the satellite 1 defined by its six faces.

According to this third embodiment, it is therefore also possible to provide any type of structure of honeycomb radiating panel 12.

Thus, according to the invention, a heat pipe loop is formed from the heat pipes present on the North 6 and South 7 faces in the honeycomb radiating panels 12 that makes it possible to form a loop of heat pipes in thermal conduction contact with each other linking the North and South faces to another pair of opposite faces of the satellite, that is, either the East/West pair of faces or the Earth/anti-Earth pair of faces. According to the invention, a structure is not provided inside the satellite to allow for the formation of this loop as the heat pipes are provided on the surface of the faces of the satellite.

Through the formation of this loop, the dissipation of the heat emitted by the hot sources 19 provided on the North 6 and South 7 faces and distributed in the various heat pipes in this loop depending on the exposure level of the various faces to which the heat pipes are attached, becomes self-regulating.

The present invention applies preferably to a spacecraft located in a geostationary orbit. Nonetheless, the principle of the invention remains the same for a spacecraft located in any orbit around the Earth, for example HEOs (High Eccentricity Orbits) or inclined orbits.

As an alternative to the embodiments shown in the figures, in which the radiating panels 12 are attached to the front face of the second vertical branches 23 of the connecting heat pipes 21 provided on the East 8, West 9, Earth 5A and anti-Earth 5B faces, it is also possible to provide that the radiating panels 12 be attached to the rear face of the second vertical branches 23 of the connecting heat pipes 21.

The invention claimed is:

1. A device for controlling heat flows in a spacecraft that always has a same face turned towards the Earth, a pair of opposite, parallel North and South faces perpendicular to the North-South axis of the Earth and two pairs of opposite, parallel faces, East/West and Earth/anti-Earth, heat-dissipating or -transmitting equipment being provided on internal walls of said North and South faces, the device comprising a plurality of heat pipes connecting said North and South faces of said craft to another pair of opposite faces of said craft and passively forming a loop of heat pipes in thermal conduction contact with each other.

2. The device according to claim 1, further including at least one pair of connecting heat pipes with first and second branches, a first branch of one of said connecting heat pipes of said pair of connecting heat pipes being attached, in thermal conduction contact, to a radiating panel on said North face, and a first branch of the other connecting heat pipe of said pair of connecting heat pipes being attached, in thermal conduction contact, to a radiating panel on said South face.

3. The device according to claim 2, wherein said first branch of at least one of said connecting heat pipes is attached to at least one part of an extension of said radiating panel on either said North face or said South face, overhanging said other pair of opposite faces.

4. The device according to claim 2, wherein said first branch of at least one of said connecting heat pipes is attached to an internal wall of said radiating panel either on said North face or on said South face, in an internal volume defined by faces of said spacecraft.

5. The device according to claim 2, wherein said second branch of at least one of said connecting heat pipe is attached to an external wall of one of faces belonging to said other pair of opposite faces.

6. The device according to claim 2, wherein a radiating panel is attached to said second branches of said pair of connecting heat pipes.

7. The device according to claim 2, wherein said first and second branches of at least one of said connecting heat pipe are the same length.

8. The device according to claim 2, wherein said second branch of one of said connecting heat pipes of said pair of connecting heat pipes is attached in thermal conduction contact to another second branch of another connecting heat pipe of said pair of connecting heat pipes, which itself is attached to an external wall of one of the faces belonging to said other pair of opposite faces.

9. The device according to claim 8, wherein said second branch of one of said connecting heat pipes is longer than said first branch of said connecting heat pipe.

10. The device according to claim 8, wherein a plate, preferably aluminium, is attached to said second branches of said connecting heat pipes on a same face belonging to said other pair of opposite faces, which are in thermal conduction contact with a second branch of another connecting heat pipe.

11. The device according to claim 8, wherein said second branch of at least one of said connecting heat pipes, which is attached to said second branch of another connecting heat pipe comprises a pair of fins tangential to a tubular component in which a coolant circulates, one of said fins having a larger transverse dimension than another fin.

12. The device according to claim 1, wherein at least one radiating panel with a honeycomb structure is provided on said North and South faces, on or in which networks of heat pipes are attached.

13. The device according to previous claim 12, wherein said the honeycomb structure comprises a first network of heat pipes housed in cells of said honeycomb structure and a second network of heat pipes placed externally on a surface of said honeycomb structure and perpendicular to the heat pipes in said first network.

14. The device according to claim 12, wherein said honeycomb structure comprises a first network of heat pipes housed in cells of said honeycomb structure and a second network of heat pipes passing through said cells perpendicularly to the heat pipes in said first network.

15. A spacecraft equipped with a heat flow control device, said spacecraft always having a same face, turned towards the Earth, a pair of opposite, parallel North and South faces perpendicular to the North-South axis of the Earth and two pairs of opposite, parallel faces, East/West and Earth/anti-Earth, heat-dissipating or -transmitting equipment being provided on internal walls of said North and South faces, the device comprising a plurality of heat pipes connecting said North and South faces of said craft to another pair of opposite faces of said craft and passively forming a loop of heat pipes in thermal conduction contact with each other.

* * * * *